United States Patent
Thor et al.

(10) Patent No.: US 11,763,091 B2
(45) Date of Patent: Sep. 19, 2023

(54) AUTOMATED CONTENT TAGGING WITH LATENT DIRICHLET ALLOCATION OF CONTEXTUAL WORD EMBEDDINGS

(71) Applicant: Palo Alto Networks, Inc., Santa Clara, CA (US)

(72) Inventors: Nandan Gautam Thor, Mountain View, CA (US); Vasiliki Arvaniti, Amsterdam (NL); Jere Armas Michael Helenius, Cupertino, CA (US); Erik Michael Bower, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 616 days.

(21) Appl. No.: 16/800,665

(22) Filed: Feb. 25, 2020

(65) Prior Publication Data
US 2021/0264116 A1    Aug. 26, 2021

(51) Int. Cl.
*G06F 40/30* (2020.01)
*G06F 40/284* (2020.01)
*G06N 3/08* (2023.01)
*G06N 3/047* (2023.01)

(52) U.S. Cl.
CPC .......... *G06F 40/30* (2020.01); *G06F 40/284* (2020.01); *G06N 3/047* (2023.01); *G06N 3/08* (2013.01)

(58) Field of Classification Search
CPC ............................ G06F 40/30; G06F 40/284
See application file for complete search history.

(56) References Cited

U.S. PATENT DOCUMENTS

| | | | |
|---|---|---|---|
| 9,645,999 B1* | 5/2017 | Ciulla | G06F 16/35 |
| 2016/0188702 A1* | 6/2016 | Lee-Goldman | G06F 16/3322 707/749 |
| 2017/0270006 A1* | 9/2017 | Kandylas | G06Q 50/01 |
| 2018/0060299 A1* | 3/2018 | Bastide | H04L 51/52 |
| 2018/0060437 A1 | 3/2018 | Gao et al. | |

(Continued)

OTHER PUBLICATIONS

Bolelli, et al., "What is Trendy? Generative Models for Topic Detection in Scientific Literature", [online] retrieved on Jan. 20, 2020 from http://web.mit.edu/seyda/www/Papers/ECIR_extended.pdf, 2009, 29 pages.

(Continued)

*Primary Examiner* — Kevin Ky
(74) *Attorney, Agent, or Firm* — Gilliam IP PLLC

(57) ABSTRACT

Dynamic content tags are generated as content is received by a dynamic content tagging system. A natural language processor (NLP) tokenizes the content and extracts contextual N-grams based on local or global context for the tokens in each document in the content. The contextual N-grams are used as input to a generative model that computes a weighted vector of likelihood values that each contextual N-gram corresponds to one of a set of unlabeled topics. A tag is generated for each unlabeled topic comprising the contextual N-gram having a highest likelihood to correspond to that unlabeled topic. Topic-based deep learning models having tag predictions below a threshold confidence level are retrained using the generated tags, and the retrained topic-based deep learning models dynamically tag the content.

20 Claims, 6 Drawing Sheets

(56) References Cited

U.S. PATENT DOCUMENTS

| | | | | |
|---|---|---|---|---|
| 2018/0067910 | A1* | 3/2018 | Alonso | H04L 67/306 |
| 2018/0300315 | A1 | 10/2018 | Leal et al. | |
| 2020/0125671 | A1* | 4/2020 | Li | G06F 16/335 |
| 2020/0134103 | A1* | 4/2020 | Mankovskii | G06F 40/56 |
| 2020/0364723 | A1* | 11/2020 | Gitlevich | G06Q 30/016 |
| 2020/0394509 | A1* | 12/2020 | Thomas | G06N 3/047 |
| 2020/0410163 | A1* | 12/2020 | Shah | G06F 9/5072 |
| 2021/0157983 | A1* | 5/2021 | Kalluri | G06N 5/04 |
| 2021/0264116 | A1* | 8/2021 | Thor | G06F 40/30 |

OTHER PUBLICATIONS

Ó Séaghdha, et al., "Probabilistic Distributional Semantics with Latent Variable Models", Computational Linguistics 2014 40:3, 587-631.
PCT Application No. PCT/US2021/019452, Written Opinion of the International Preliminary Examining Authority, dated Feb. 15, 2022, 14 pages.
Mikolov, et al., "Efficient Estimation of Word Representations in Vector Space", Retrieved from the Internet: <https://arxiv.org/abs/1301.3781 >, Jan. 16, 2013, 12 pages.
PCT Application No. PCT/US2021/019452 International Search Report, dated Jun. 18, 2021, 4 pages.
PCT Application No. PCT/US2021/019452 International Written Opinion, dated Jun. 18, 2021, 11 pages.
Gaur, et al., "'Let Me Tell You About Your Mental Health!': Contextualized Classification of Reddit Posts to DSM-5 for Web-based Intervention", ACM Digital Library, CIKM '18: Proceedings of the 27th ACM International Conference on Information and Knowledge Management, https://doi.org/10.1145/3269206.3271732, Oct. 17, 2018, pp. 753-762.

* cited by examiner

AUTOMATED CONTENT TAGGING WITH LATENT DIRICHLET ALLOCATION OF CONTEXTUAL WORD EMBEDDINGS

BACKGROUND

The disclosure generally relates to artificial intelligence and classification or recognition.

A latent Dirichlet allocation (LDA) model is an unsupervised learning model that predicts a set of latent variables that explain similarity between subsets of observable variables. For instance, if the observable variables are words or phrases in content, the latent variables can be topics related to the words or phrases. The LDA model can be represented as a probabilistic graph model representing the dependency between the latent variables and observable variables. The LDA model can learn the latent variables from the observable variables using the probabilistic graph model via Bayesian inference. LDA models are "generative" in the sense that they attempt to model the joint probability distribution of an observed variable—the words or phrases in a document—and a hidden (latent) variable—the unknown topics.

BRIEF DESCRIPTION OF THE DRAWINGS

Aspects of the disclosure may be better understood by referencing the accompanying drawings.

DESCRIPTION

Figure 1:
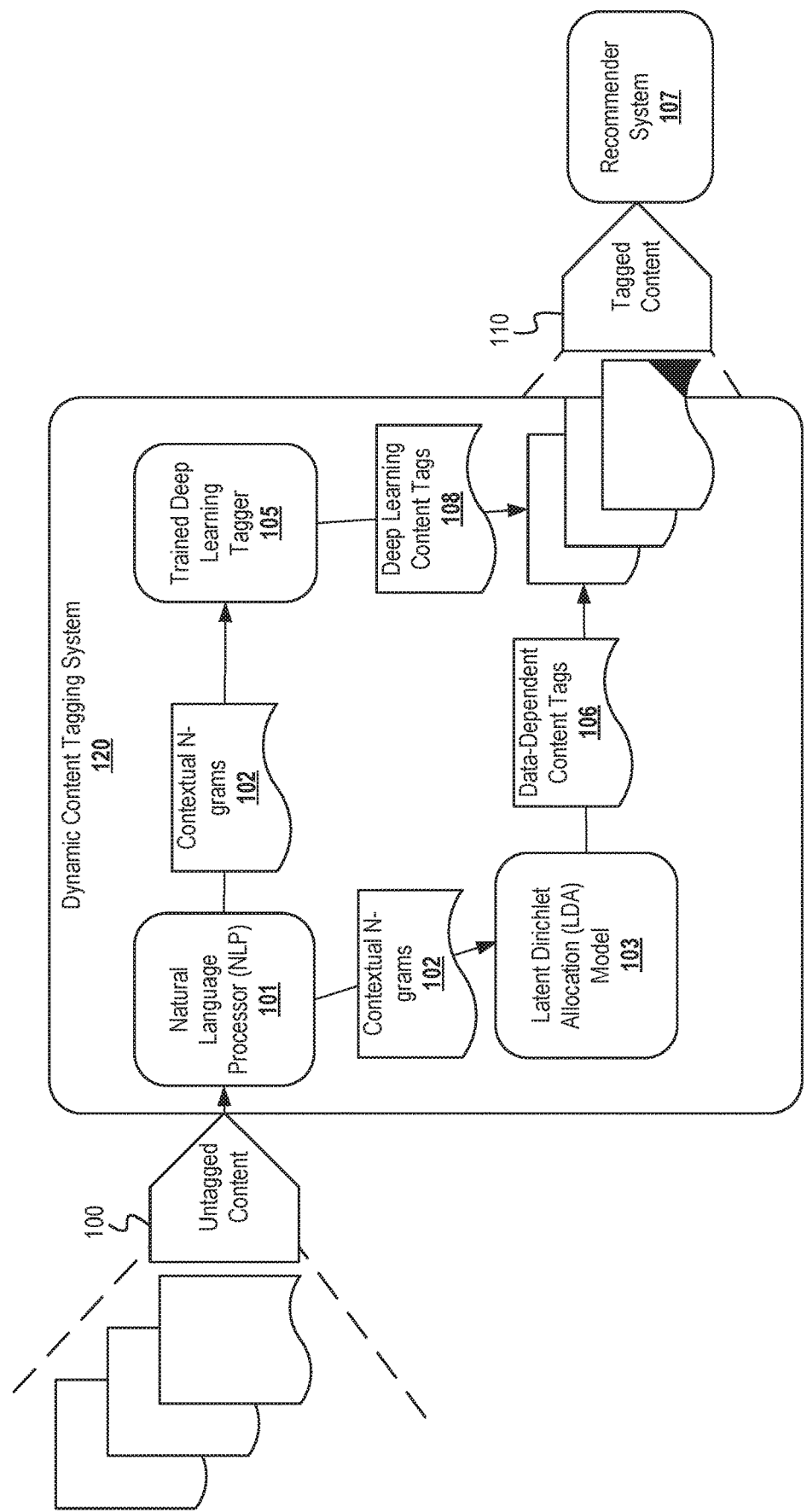
FIG. 1 is a schematic diagram of a workflow for automated content tagging with contextual N-grams and a latent Dirichlet allocation model.

The description that follows includes example systems, methods, techniques, and program flows that embody aspects of the disclosure. However, it is understood that this disclosure may be practiced without these specific details. For instance, this disclosure refers to training LDA models to generate data-dependent content tags in illustrative examples. Aspects of this disclosure can be instead applied to training other types of generative models to generate data-dependent content tags. In other instances, well-known instruction instances, protocols, structures and techniques have not been shown in detail in order not to obfuscate the description.

Overview

In order to properly filter, recommend, or otherwise allocate content to an end-user, the content is categorized by various tags. Typically, tags can be generated manually by a test user categorizing the content. This can result in narrow tags with variable accuracy, and models used to allocate content (e.g., by computing similarity between an end-user and a set of tags associated with content) can suffer from limited training data. The technology disclosed herein automatically generates descriptive content tags and uses these descriptive tags to supplement predicted tags from a deep learning model(s) trained on manually tagged content and/or train the deep learning model(s) that predict tags for content. These descriptive content tags enable accurate, automated content categorization and allocation with less training data by improving the quality of each tag.

A natural language processor (NLP) receives untagged content (e.g., web pages, white pages, datasheets, etc.) and preprocesses the content by removing punctuation/stop words and generating contextual N-grams that represent coherent, substantive phrases in the content based on a specified domain, such as cybersecurity. A contextual N-gram is a group of words that together represent a concept or form a conceptual unit. The NLP sends the contextual N-grams to a latent Dirichlet allocation (LDA) model. The LDA model is an unsupervised topic model that, for each contextual N-gram or phrase, generates a vector of probabilities (likelihoods) that the phrase corresponds to one of a predetermined number of unspecified/unlabeled topics. The LDA model then labels each topic with a phrase having a highest likelihood of corresponding to that topic. This label is a data-dependent tag for the content and can be validated against source training data (i.e. manually tagged content) for accuracy. Trained deep learning models additionally receive the untagged content and predict tags from a set of known tags. The data-dependent tags are sent to supplement training of the deep learning models. In addition or alternatively, the data-dependent tags are provided as an alternative to predicted tags output by the deep learning models. If confidence values of the predicted tags from the deep learning models fail to satisfy a confidence threshold, a recommender uses the tags from the deep learning models after supplemental training instead of the low confidence predicted tags or supplements the low confidence predicted tags with the data-dependent tags. With the data-dependent tags generated by the LDA model supplementing the predicted tags, the recommender system can allocate content more accurately with less tagged training data. Moreover, the LDA model can automatically generate new tags for incoming content that supplement (possibly low confidence) tags generated by the trained deep learning models, which facilitates dynamic content tagging and reduces reliance on stakeholders or manual tagging that can be slow to adapt and/or flawed.

Example Illustrations

FIG. 1 is a schematic diagram of a workflow for automated content tagging with contextual N-grams and a latent Dirichlet allocation model. A natural language processor (NLP) 101 receives untagged content 100 and generates contextual N-grams 102 based on the untagged content 100. The NLP 101 forwards the contextual N-grams 102 a trained deep learning tagger 105 and, optionally, to a latent Dirichlet allocation (LDA) model 103. The LDA model 103 can use the contextual N-grams 102 as well as a predetermined number of topics as input to generate data-dependent content tags 106. A trained deep learning tagger 105 uses the contextual N-grams 102 to generate deep learning content tags 108. A recommender system 107 receives the tagged content 110 comprising the untagged content 100, the deep learning content tags 108, and optionally the data-dependent content tags 106. Although depicted as an LDA model 103, other generative models are within the scope of this disclosure. Embodiments can also use other models, such as latent semantic analysis and other topic models.

The NLP 101 extracts contextual N-grams 102 from the untagged content 100 using a word embedding of N-grams present in the untagged content 100. The untagged content 100 can be user documents, web pages, white pages, datasheets, advertisements, emails, or any other text data that can be appropriately allocated using content tags. The contextual N-grams 102 comprise vectors of real numbers generated by the NLP 101 that represent N-grams in the untagged content 100, where N-grams having common contexts have word embeddings (i.e. vectors of real numbers) that are close together in Euclidean space. For instance, the N-grams "Cheshire Cat" and "Alice in wonderland" have a common context and therefore should have word embeddings that are close together, whereas "Cheshire Cat" and "Iron Man" have dissimilar contexts and should have word embeddings that are far apart. The NLP 101 generates the word embeddings in two phases: first, tokens are extracted from the untagged content 100 and second, the tokens are used as input into a model running on the NLP 101 that generates word embeddings. Each "token" extracted in the first phase above can be alternatively referred to as a unigram or a word.

During the tokenization phase, the NLP 101 removes punctuation, stop words, and any extraneous characters from the untagged content. The stop words can be common words according to a list, and the list of stop words can depend on the type of untagged content 100 being received by the NLP 101. As an additional step, the words can be converted into numerical vectors that can be processed by a model. For instance, one-hot encoding on the entire vocabulary of the content can be implemented, or any other similar encoding algorithm.

During the embedding phase, the NLP 101 inputs the tokens from the tokenization phase into a word embedding model to generate the contextual N-grams 102. A "contextual N-gram" refers to one or more tokens extracted from the untagged content 100 that are adjacent in the untagged content 100. The word embedding model can be any standard word embedding model configured to generate embeddings of N-grams. For example, a skip-gram (a.k.a. word2vec) model can be used to generate vectors of each token in the untagged content 100. N-gram embeddings can be computed as an average of the skip-gram token embeddings for each token in the N-gram. Other models, such as GloVe, Ngram2vec, and Sent2vec which use local or global context to compute N-gram embeddings can be used. In the skip-gram example, local context refers to a window of tokens around each token in the N-gram. The skip-gram model is a neural network that predicts tokens in the window of tokens around a given token using the token as input to the neural network. Therefore, the resulting embeddings of each token depend on the local context (i.e. window of tokens around the input token), and the embedding of the N-gram which is the average of the embeddings of each token in the N-gram depends on the local context of each token in the N-gram. For the GloVe model, a token co-occurrence matrix (whose (i,j)th entry is the number of instances that the ith and jth token in the untagged content 100 occur next to each other) is factored to extract vectors representing context for each token in the untagged content 100. The meaning of local and global context can vary depending on the model for word embeddings used, with two illustrative examples given above. In the above examples, local context is restricted to the document containing an N-gram, whereas global context can refer to all of the content.

For both local and global context, a contextual N-gram is determined based on proximity of tokens using the appropriate notion of context. For instance, for the skip-gram model, when the neural network predicts a set of adjacent (i.e. consecutive and containing a current token) tokens to an input token with sufficiently high confidence, then the group of tokens comprising the input token and the set of adjacent tokens can be aggregated into a contextual N-gram. Different methods for choosing contextual N-grams can be used for different word embedding models.

Although described as N-grams, the contextual N-grams 102 can be numerical vectors that can be input into models such as the trained LDA model 103. Once the LDA model 103 generates the data-dependent content tags 106, the NLP 101 can revert the numerical vectors (comprising these content tags) back into words using the encoding scheme described above. The phrase "contextual N-gram" is used interchangeably throughout to refer to both the words in the N-grams and the corresponding numerical representation.

The trained LDA model 103 receives the contextual N-grams 102 and clusters them according to unlabeled topics. The number of topics can be a hard-coded parameter in the trained LDA model 103 or can be a manual input. The number of topics can depend on the type of untagged content 100 and can be optimized prior to deployment of the LDA model 103. The LDA model 103 clusters the contextual N-grams 102 by predicting which contextual N-grams 102 correspond to each topic in the unlabeled topics (each cluster corresponding to an unlabeled topic). The prediction is based on a probabilistic graph model that models the probability of the observed words based on a number of related latent variables including a Dirichlet prior on the per-document topic distributions, a Dirichlet prior on the per-topic token distribution, the topic distribution for each document, the token distribution for each document, and the topic distribution for each token in each document. Here, each document in the untagged content 100 is represented as the corresponding tokens extracted from that document in the contextual N-grams 102. Using standard techniques in Bayesian inference, such as variational Bayes, Gibbs sampling, or expectation propagation, etc. and the dependencies among the above variables, the probability for each of the contextual N-grams 102 to correspond to each unlabeled topic is computed. The resulting trained LDA model therefore comprises a weighted vector for each contextual N-gram in the contextual N-grams 102 that indicates a likelihood (probability) that the contextual N-gram corresponds to each topic. In some embodiments, the LDA model 103 comprises multiple LDA sub-models corresponding to each document in the content and trained independently on the contextual N-grams from the respective documents.

The resulting clusters from training the LDA model 103 comprise the subset of the contextual N-grams 102 having a greatest likelihood value of corresponding to that unlabeled topic. Within each unlabeled topic, a label is generated as the contextual N-gram 102 in that topic having a highest probability (i.e. likelihood value) of corresponding to that unlabeled topic. For example, if an unlabeled topic corresponds to the contextual N-grams "tumbleweed" with probability 0.6, "arid" with probability 0.4, and "desert" with probability 0.95, then the topic is labelled with "desert" having the highest probability of corresponding to that topic. The LDA model 103 aggregates these topic labels into the data-dependent content tags 106.

The NLP 101 additionally sends the contextual N-grams 102 to the trained deep learning tagger 105. The trained deep learning tagger 105 comprises multiple deep learning models that tag the untagged content 100 according to various topics. The deep learning tagger 105 can preprocess the untagged content 100 into a format that these deep learning models can use as input, as described in further detail with reference to FIG. 2. The generated deep learning content tags 108 are aggregated into the tagged content 110.

In some embodiments, the deep learning content tags 108 are determined prior to deployment of the dynamic content tagging system 120 and are not updated. Conversely, as the untagged content 100 is received in a data stream, the LDA model 103 is dynamically generated for batches of incoming content, and the data-dependent content tags 106 are dynamically updated and included in the recommender system 107. This allows the recommender system 107 to detect and compensate for time-dependent changes in the incoming content. In some embodiments the LDA model 103 is not trained and data-dependent content tags 106 are not used. The pipeline of feeding the untagged content into the NLP 101 which generates contextual N-grams 102 and sends them to the LDA model 103, which in turn generates the data-dependent content tags 106 can be used as a means for online generation of content tags without having to retrained the trained deep learning tagger 105 as content is received. The criterion for when to use this pipeline can vary depending on the type of deep learning model, the type of content, the amount of content received, etc.

The recommender system 107 receives the tagged content 110 (comprising the data-dependent content tags 106, the deep learning content tags 108, and the untagged content 100) and generates recommendations using the enhanced content tags. The recommender system 107 can be any content-based recommender system and can vary based on the type of tagged content 110.

To exemplify, the recommender system 107 can be a URL filter that monitors and filters user website access over HTTP and HTTPS addresses. The untagged content 100 can comprise URLs, and content received in response to HTTP GET requests to the URLs. The NLP 101 can then extract contextual N-grams 102 from the content received from the HTTP requests. The generated data-dependent content tags 106 and the deep learning content tags 108 can be indicators of whether websites corresponding to the URLs should be filtered, for example indicators that a website is malicious, categories for the websites, etc. The recommender system 107 can filter content received from websites based on tags in the tagged content 110 and a set of hard coded preferences. The set of preferences can indicate particular categories of content (i.e., topics) from URLs to filter. For instance, URLs related to social media or news or URLs containing mature content can be blocked by the recommender system 107, and URLs related to software as a service (SaaS) or other business-related websites can be allowed by the recommender system 107. The recommender system 107 can additionally maintain a white list and black list of websites to automatically block and allow respectively, and these lists can be dynamically updated. Finer granularity of categories, such as tolerated, blocked, and allowed websites can be implemented.

The dynamic content tagging system 120 can be a component of a firewall or malware detector and can receive untagged content in a data stream for online threat detection. The data-dependent content tags 106 and deep learning content tags 108 can be processed by the recommender system 107 for known malicious tags. The firewall or malware detector can be implemented in different components of a user-level system or network. For instance, the untagged content can be activity of a SaaS application and the trained deep learning tagger 105 can be trained on data specific to the SaaS application in order to detect and tag normal and/or abnormal behaviors, in which case the different types of behaviors would be topics from the perspective of the models/taggers. Therefore, the malware detector can be implemented across systems and can intercept and filter traffic between nodes in a network. The context and scope of the dynamic content tagging system 120 and recommender system 107 can be user-specified and can vary depending on the sensitivity of particular SaaS applications, particular nodes in a network, particular users, etc. Because the tagged content 110 is dynamically generated, the recommender system 107 can classify content and/or behavior as malicious before systems are compromised.

In some embodiments, the recommender system 107 can maintain profiles for users, applications, nodes in a network, etc. to monitor behavior. The profiles can comprise lists of tags that are normal and lists of tags that are abnormal, and the recommender system 107 can verify tags in the tagged content 110 against these lists to detect malicious behavior. These profiles can by dynamically updated as new threats are detected or behavior changes. The profile updates can use the data-dependent content tags 106 to enrich the existing tags in the profile. Dynamically generated tags can be flagged as normal or abnormal by an expert or based on activity for corresponding entities from which the untagged content 100 was received as they are added to the profiles.

Figure 2:
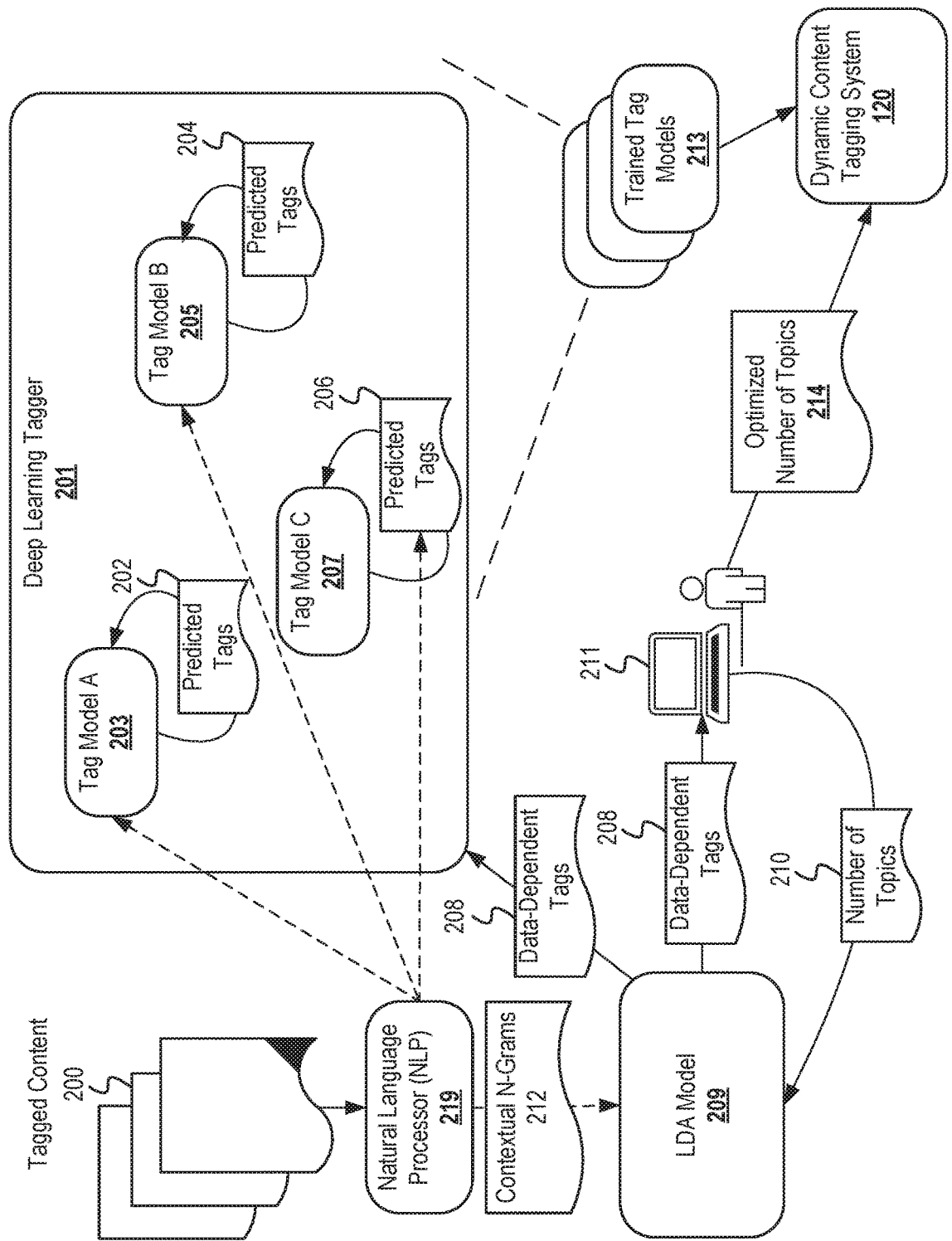
FIG. 2 depicts training for a content tagging system that uses contextual N-grams and an LDA model.

FIG. 2 depicts training for a content tagging system that uses contextual N-grams and an LDA model. A deep learning tagger 201 receives tagged content 200. The deep learning tagger 201 comprises a tag model A 203, a tag model B 205, and a tag model C 207. The deep learning tagger 201 trains the models 203, 205, and 207 to predict tags for the contextual N-grams 212. Using the predicted tags 202, 204, and 206 output by the models 203, 205, and 207 respectively, the deep learning tagger 201 trains the internal parameters of the models 203, 205, and 207 based on the difference between the predicted tags 202, 204, and 206 and the tags in the tagged content 200. If the confidence of output for the tag models 203, 205, and 207 is below a threshold confidence level, then a natural language processor (NLP) 219 receives the tagged content 200 and generates contextual N-grams 212 which it sends to an LDA model 209. The LDA model 209 receives the contextual N-grams 212 and generates data-dependent tags 208 which it sends the deep learning tagger 201. The deep learning tagger 201 uses the data-dependent tags 208 to supplement the training data and retrains the tag models 203, 205, and 207. Once trained and the confidence of outputs of the models 203, 205, and 207 is above a threshold confidence level, the deep learning tagger 201 stores the trained topic models 213 in the dynamic content tagging system 120. The tagged content 200 comprises previously tagged content that can be manually tagged by a user and verified based on deploying the content using the tags to a recommender system. The quality of the generated recommendations can be verified using domain-specific metrics (for instance, if the recommender system is generating advertisements, the click-through rate).

Independent and/or parallel to the above operations, the LDA model 209 receives the contextual N-grams and generates data-dependent tags 208 which it sends to a user 211. The user 211 evaluates the data-dependent tags 208 and based on the evaluation sends a number of topics 210 to the LDA model 209. The LDA model 209 then generates a new set of data-dependent tags 208 for the number of topics 210. This cycle continues until the user 211 decides that the data-dependent tags 208 are contextually accurate for the tagged content 200, and the corresponding optimized number of topics 214 is stored by the dynamic content tagging system 120.

Although depicted as three tag models 203, 205, and 207, the deep learning tagger can comprise any number of models based on the type of tagged content 200 and tags required by a recommender system using the tagged content 200. For example, a business running the recommender system on marketing content may require tags for go-to-market, product, industry, buyer's journey stage, and target audience/persona. There can be five tag models corresponding to each of these types of tags. The tag models 203, 205, 207 can vary in complexity based on the type/amount of training data and complexity of predicting each tag. For example, for a product tag, a simple model such as logistic regression can be implemented whereas for a more difficult tag such as buyer's journey stage, a neural network can be implemented.

Each of the tag models 203, 205, and 207 can preprocess the tagged content 200 so that it can be used as input to a deep learning model. These models 203, 205, and 207 can operate in communication with the NLP 219 to generate word embeddings for the tagged content 200. Additional preprocessing steps such as normalization and/or transformation of the data can be used depending on the type of deep learning models. Both the content in the tagged content 200 and the tags can be preprocessed, so that the deep learning models learn to predict the processed tags (e.g., as word embeddings). The NLP 219 can additionally be used to convert the predicted embeddings by the tag models 203, 205, and 207 back to words that can be used as predicted tags.

Once the tagged content 200 is processed into appropriate inputs for each of the models 203, 205, and 207, the models respectively generate predicted tags 202, 204, and 206 based on the inputs. Using the difference between the predicted tags 202, 204, and 206 and tags indicated in the tagged content 200, the models 203, 205, and 207 update their internal parameters using a loss function of this difference. Depending on the type of deep learning model used, the training can continue until convergence, until a predetermined number of iterations has been reached, or until another termination criterion is reached. If the confidence of outputs from the model 203, 205, and 207 on test data is below a threshold confidence level, then the NLP 219 processes the tagged content 200 to generate the contextual N-grams 212, as described above with reference to FIG. 1, and the LDA model 209 trains on the tagged content 200 to generate the data-dependent tags 208. The deep learning tagger 201 adds the data-dependent tags 208 to training data for the model 203, 205, 207 (e.g., by adding the tags as possible outcomes) and retrains the models until a threshold confidence level (e.g. 90%) is reached. The threshold confidence level can be a confidence level for all of the models 203, 205, and 207, can be for an average of the confidence levels, etc. Once trained, the dynamic content tagging system 120 stores the trained topic models.

The operations of generating the contextual N-grams 212, training and/or retraining the LDA model 209 to determine the optimized number of topics 210 based on feedback from a user 211 and sending data-dependent tags 208 to the deep learning tagger 201 are optional. These operations can only be performed when models 203, 205, and 207 have outputs below a threshold confidence level, or according to other considerations such as desired computation time for tag generation.

The LDA model 209 receives the contextual N-grams 212 and clusters them according to an unknown topic distribution on the contextual N-grams 212 as described variously above. The initial number of topics 210 can be randomized or can be chosen by the user 211. Once the LDA model 209 clusters/tags the topics, the user 211 receives the generated data-dependent tags 208. The user 211 can be a domain-level expert and can verify quality of the data-dependent tags 208. If the quality of the data-dependent tags 208 is insufficient, the user 211 can adjust the number of topics 210 and sends the updated number back to the LDA model 209. The meaning of "quality" of the data-dependent tags 208 can vary depending on the type of content. For example, if the content is email documents then the user 211 can evaluate how descriptive the data-dependent tags 208 are for categorizing emails as spam.

Although depicted as determined by a user 211, the optimized number of topics 214 can be determined in an automated manner by a computer, and the criterion for the data-dependent tags 208 having sufficient quality can be an objective metric. For example, the generated data-dependent tags 208 can be implemented in a recommender system with A/B testing, comparing the additional tags to the base predicted tags generated by the trained topic models 213. The criterion for sufficient quality can thus be a percentage improvement over the baseline in the A/B testing. Alternatively, when the recommender system is part of a firewall or malware detector, quality can correspond to threat detection rate. In some embodiments, the optimized number of topics 214 can be a hard-coded value pertaining to the type of content being generated. Once generated, the dynamic content tagging system 120 stores the optimized number of topics 214 for future LDA model generation.

Figure 3:
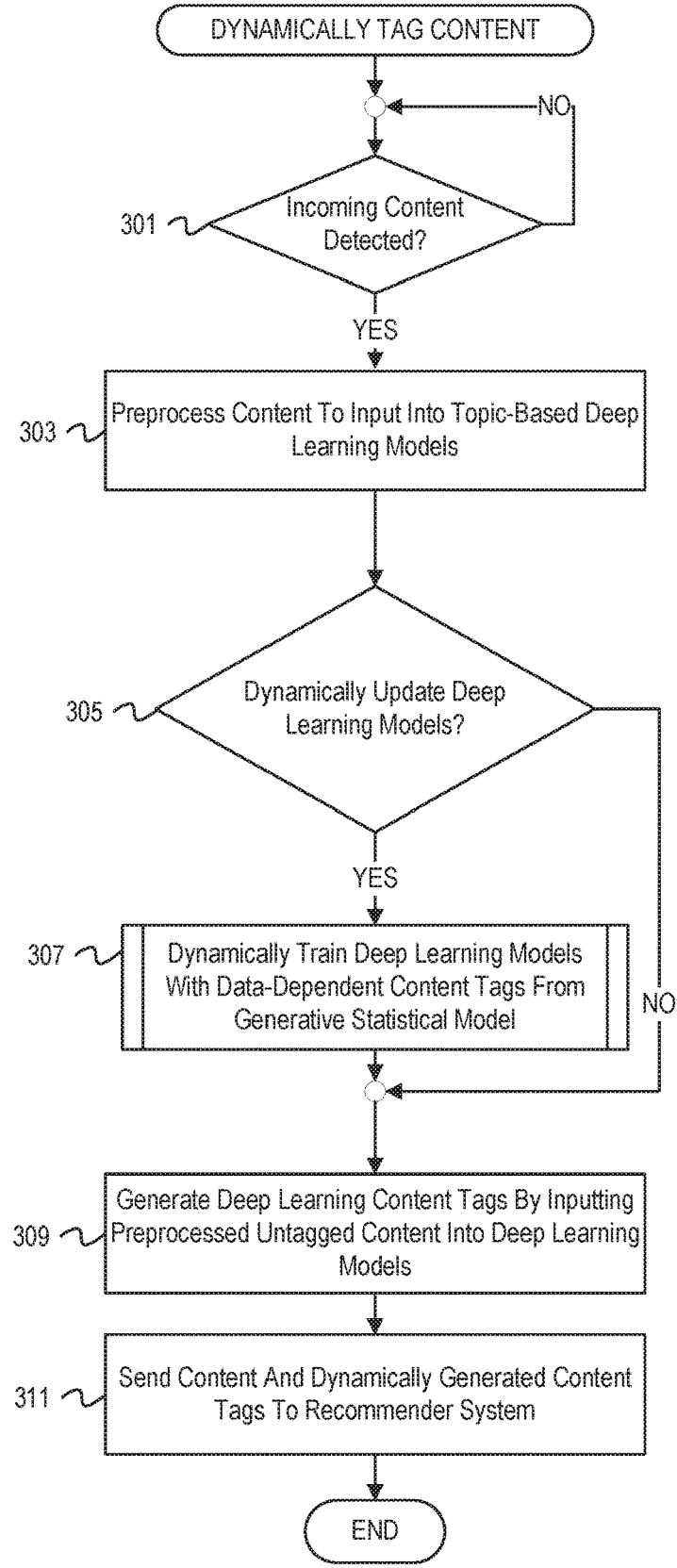
FIG. 3 is a flowchart of example operations for dynamically tagging content with topic-based deep learning models at least partially trained with generative model output.

FIG. 3 is a flowchart of example operations for dynamically tagging content with topic-based deep learning models at least partially trained with generative model output. The example operations are described with reference to a dynamic tagging system for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 301, the dynamic tagging system detects incoming content. The incoming content can be received as a data stream or in batches of data. The dynamic tagging system can collect incoming content according to a schedule or can wait until a threshold amount of content is received.

At block 303, the dynamic tagging system preprocesses the content into a format that can be input into topic-based deep learning models. The dynamic tagging system can tokenize the content and can convert the tokenized content into numerical vectors using an encoding scheme. The dynamic tagging system can further normalize and/or transform the data depending on the type of topic-based deep learning models and can perform different normalizations and transformations for each model. In some embodiments, the dynamic tagging system can generate numerical vectors for the untagged content without tokenizing the content.

At block 305, the dynamic tagging system determines whether to dynamically update the content tag models. This determination can be based on an amount of incoming content, a time period since the content tag models were last updated, a domain-level expert assessing that content has changed for the purposes of categorization, etc. If the dynamic tagging system determines to dynamically update the deep learning models, operations proceed to block 307. Otherwise, operations skip to block 309.

At block 307, the dynamic tagging system dynamically trains the deep learning models based on data-dependent content tags output from a generative statistical model, such as the previously mentioned LDA model. The output from the generative statistical model will be based on contextual N-grams generated from the content detected at block 301. The operations for dynamically training the deep learning models are described in FIG. 4 below.

At block 309, the dynamic tagging system generates deep learning content tags by inputting preprocessed untagged content into the deep learning models. The deep learning models are pretrained to predict tags corresponding to a specific topic using untagged content preprocessed into a format specific to each deep learning model. The deep learning models can additionally output a confidence value for the predicted deep learning content tags.

At block 311, the dynamic tagging system aggregates the content and dynamically generated content and forwards it to a recommender system. The recommender system can be any system that allocates content to relevant/engaged endpoints as described variously above.

Figure 4:
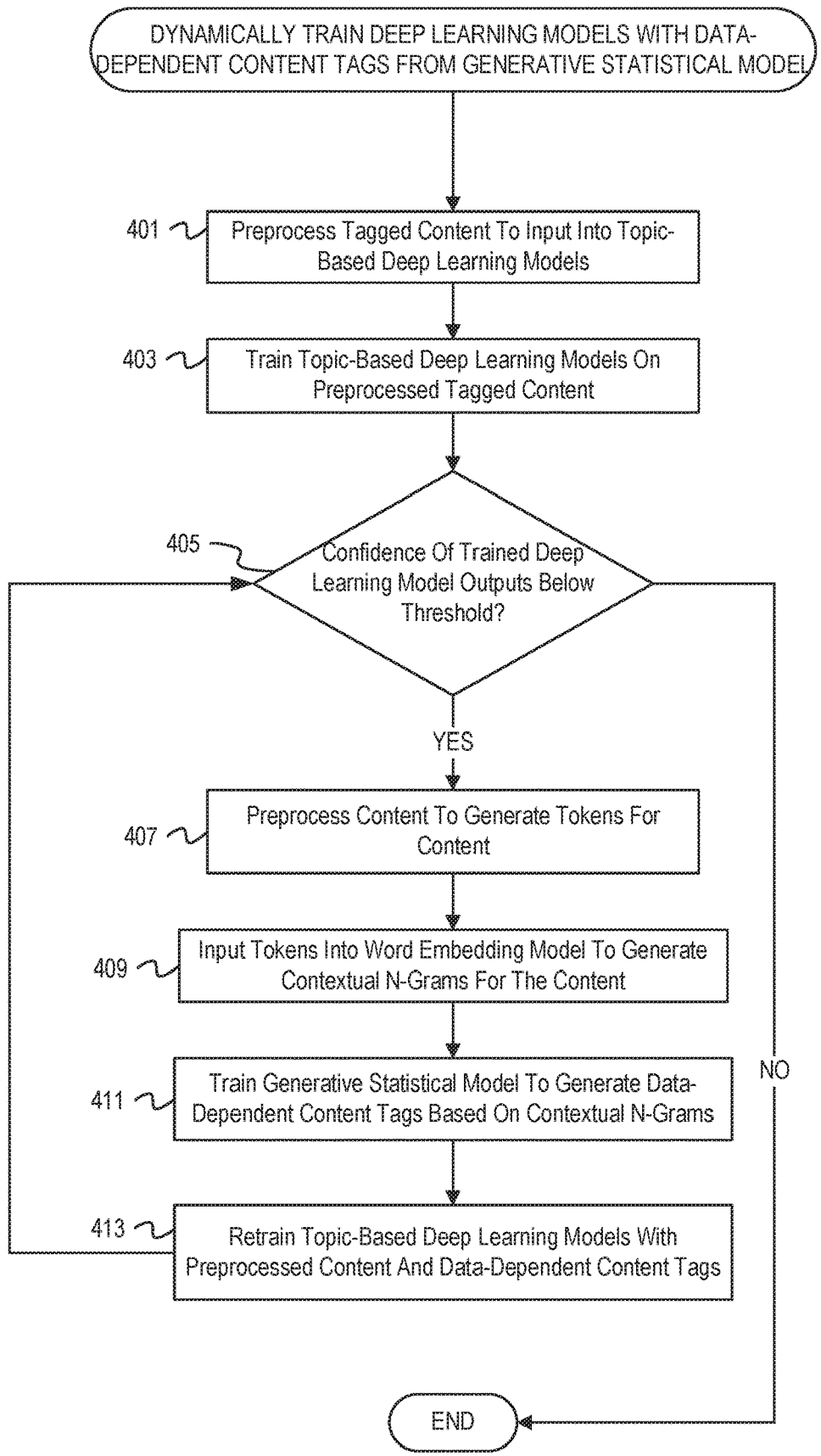
FIG. 4 is a flowchart of example operations for dynamically training deep learning models for content tagging.

FIG. 4 is a flowchart of example operations for dynamically training deep learning models for content tagging. The example operations are described with reference to a dynamic deep learning tagger for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 401, the deep learning tagger preprocesses tagged content to input into topic-based deep learning models. This operation can occur, for example, as described at block 303 with reference to FIG. 3. In some embodiments, the content will have already been preprocessed at an early stage in the content tagging workflow.

At block 403, the deep learning tagger trains topic-based deep learning models on the preprocessed tagged content generated at block 401. The deep learning tagger can input the tagged content without tags into the topic-based deep learning models and can update the internal parameters of the topic-based deep learning models based on a comparison with the model outputs and tags for the content. In some embodiments, the deep learning tagger can convert the tags to numerical vectors using natural language processing, and the comparison between model outputs and tags for the content can be a norm between the numerical vectors output by the models and the numerical vectors for the tags.

At block 405, the deep learning tagger determines whether confidence of predictions generated from the topic-based deep learning models trained at block 403 is below a threshold confidence level. If the confidence is below this threshold confidence level, then operations proceed to block 407. Otherwise, operations terminate. In some embodiments, once the loop of operations at blocks 407, 409, 411, and 413 has repeated a threshold number of times, operations terminate. The threshold confidence level can depend on the type of machine learning model, the amount of training data, the complexity of the machine learning model (e.g., neural network vs. support vector machine), etc. This threshold confidence level can be the same confidence level used during training of the topic-based machine learning models as described with reference to FIG. 2 or can be different depending on, for example, similarity between the tagged content and previous tagged content used to train the topic-based machine learning models. Because the confidence of the predictions is generated on new tagged content, in some embodiments deep learning models above a threshold confidence level for previous tagged content can require retraining on new incoming content. Alternatively, the topic-based deep learning models can be trained independently of the operations in FIG. 4 and received by the deep learning tagger (i.e., they are not known to exceed a threshold confidence level).

For embodiments where the deep learning tagger is implemented for threat detection, the threshold confidence level at block 405 can further comprise a threat detection level. For example, the retraining criterion can depend on a rate of detection for malicious activity over a network, SaaS application, user system, etc. The retraining criterion can additionally depend on known changes in user or network behavior or new attacks/security threats. The deep learning tagger can determine to retrain the topic-based deep learning models as described at blocks 407, 409, 411 and 413 below based on a combination of the above criteria.

At block 407, the deep learning tagger preprocesses content to generate tokens for the content. This tokenization can occur using standard algorithms for tokenizing content in natural language processing by removing stop words, punctuation, etc. as described variously above.

At block 409, the deep learning tagger inputs the tokens generated at block 407 into a word embedding model to generate contextual N-grams for the content. The word embedding model can be any of the standard natural language processing models that incorporate local or global context as described variously above.

At block 411, the dynamic tagging system trains a generative statistical model to generate data-dependent content tags based on the contextual N-grams. The dynamic tagging system can use techniques in Bayesian inference such as variational Bayes, Gibbs sampling, etc. to train the generative statistical model for topic detection. The quantity or number of topics (clusters) generated by the generative statistical model can be a user input or a hard-coded value and should be optimized to generate the highest quality tags based on the incoming content. The resulting trained generative statistical model comprises likelihood values that each contextual N-gram corresponds to each topic. For each cluster/unlabeled (e.g., "topic 1"), the dynamic tagging system chooses the contextual N-gram having a highest likelihood value of being a topic label as the data-dependent content tag(s). Embodiments can choose multiple contextual N-grams having the highest likelihood values for a topic.

At block 413, the dynamic tagging system retrains the topic-based deep learning models with preprocessed content and data-dependent content tags. The dynamic tagging system can add the data-dependent content tags as outcomes that the deep learning models will learn to predict. The dynamic tagging system can further reinitialize internal parameters of the deep learning models and can train them to convergence on training data comprising the content and the data-dependent tags. In some embodiments, the training data further comprises the existing tags used to train the deep learning models prior to the retraining operations at blocks 407, 409, 411, and 413.

Figure 5:
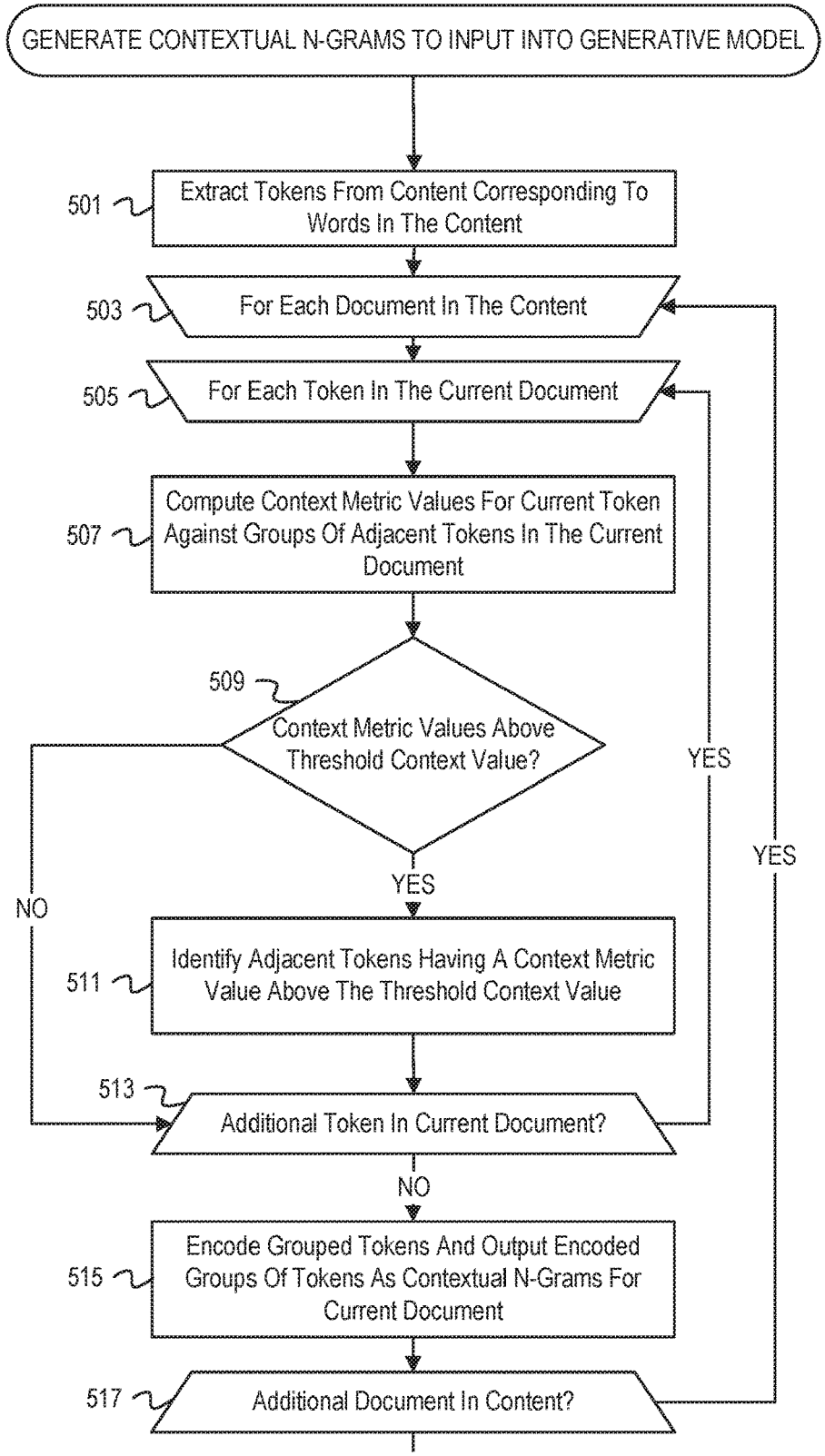
FIG. 5 is a flowchart of example operations for generating contextual N-grams for inputting into a generative model.

FIG. 5 is a flowchart of example operations for generating contextual N-grams for inputting into a generative model. The example operations are described with reference to a natural language processor (NLP) for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 501, the NLP extracts tokens from the content corresponding to words in the content. The tokenization process can comprise removing stop words and punctuation from the content as described variously above.

At block 503, the NLP begins iterating through documents in the content. The loop of operations includes the example operations at blocks 505, 507, 509, 511, 513, and 515.

At block 505, the NLP begins iterating through documents in the content. The loop of operations includes the example operations at blocks 505, 507, 509, and 511.

At block 507, the NLP computes context metric values for the current token against groups of adjacent tokens in the current document. For example, the context metric values can be confidence values that a neural network will predict tokens in a group of adjacent tokens using the current token as input, as described above with reference to the skip-gram model. Other context metric values using local and global context for the current token can be used.

At block 509, the NLP verifies whether any of the context metric values computed at block 507 are above a threshold context value. If there are context metric values above the threshold context value, operations continue to block 511. Otherwise, operations skip to block 513. Other criterion for determining whether to continue to block 511 can be used, such as whether an average context metric value for the context metric values computed at block 507 is above a threshold context value, and context metric values for adjacent tokens can additionally be used. In some embodiments, the NLP iterates through all tokens in the current document to compute context metric values before it determines whether to perform the operations at block 511.

At block 511, the NLP identifies groups of adjacent tokens (i.e., consecutive tokens containing the current token) having context metric values above a threshold context metric value. Other criterion for determining whether to group of adjacent tokens can be used, as described variously above.

At block 513, the NLP determines whether there is an additional token in the current document. If there is an additional token, operations return to block 505. Otherwise, operations continue to block 515.

At block 515, the NLP encodes the tokens grouped at block 511 and outputs the encoded groups of tokens as contextual N-grams for the current document. The contextual N-grams can be output to a generative model for determining tags for the content.

At block 517, the NLP determines whether there is an additional document in the content. If there is an additional document in the content, operations return to block 503. Otherwise, the example operations in FIG. 5 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 301 and 303 can be performed in parallel or concurrently. With respect to FIG. 3, blocks 307 is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
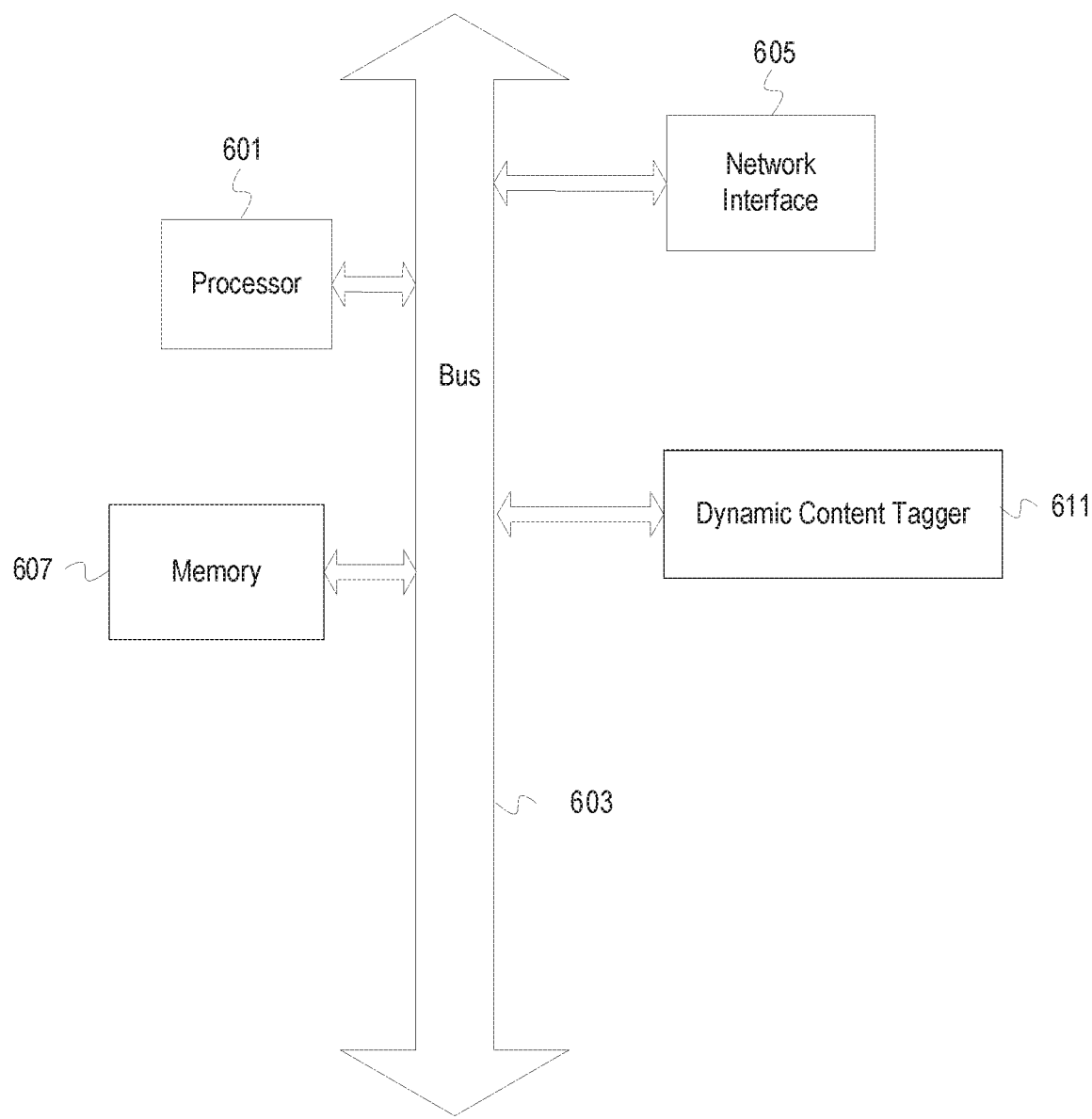
FIG. 6 depicts an example computer system with a dynamic content tagger.

FIG. 6 depicts an example computer system with a dynamic content tagger. The computer system includes a processor 601 (possibly including multiple processors, multiple cores, multiple nodes, and/or implementing multithreading, etc.). The computer system includes memory 607. The memory 607 may be system memory or any one or more of the above already described possible realizations of machine-readable media. The computer system also includes a bus 603 and a network interface 605. The system also includes a dynamic content tagger 611. The dynamic content tagger 611 can receive and process untagged content in a data stream, generate dynamic content tags using the processed content as input to a generative model, and retrain deep learning models with the dynamic content tags, as describe variously above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for generation of dynamic content tags as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

The term "content" is used throughout to refer to one or more documents each document comprising a set of words. "Content" is synonymous with "corpus," and more specifically refers to one or more related documents that share a common i.e. are related to a same subject, originate from a same or similar source, occur during an ongoing session between two nodes on a network, etc.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream is characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:
    preprocessing content to generate a plurality of contextual N-grams, wherein a contextual N-gram is a group of consecutive tokens in the content aggregated together based, at least in part, on proximity of word embeddings for words in the contextual N-gram;
    based on determining that at least one confidence value obtained as output from inputting the plurality of contextual N-grams into one or more topic-based deep learning models is below a threshold confidence value, inputting the plurality of contextual N-grams into a generative statistical model to generate a corresponding plurality of weighted vectors for the plurality of contextual N-grams, wherein each of the plurality of weighted vectors comprises likelihood values that a corresponding one of the plurality of contextual N-grams belongs to each of a plurality of topics;
    selecting tags for the content based on the plurality of weighted vectors, wherein the tags comprise at least a subset of the plurality of contextual N-grams, and wherein selecting the tags comprises, for each topic of the plurality of topics, selecting one of the plurality of contextual N-grams with a greatest of the likelihood value of belonging to the topic; and
    supplementing the one or more topic-based deep learning models with the tags.

2. The method of claim 1, wherein supplementing the one or more topic-based deep learning models with the tags comprises retraining at least a first of the one or more topic-based deep learning models with the content and the tags.

3. The method of claim 1, wherein supplementing the one or more topic-based deep learning models with the tags comprises communicating to a recommender system the tags, content, and predicted tags from the one or more topic-based deep learning models.

4. The method of claim 1, wherein the generative statistical model is a latent Dirichlet allocation model.

5. The method of claim 1, wherein inputting the plurality of contextual N-grams into the generative statistical model to generate the plurality of weighted vectors for each of the plurality of contextual N-grams comprises training the generative statistical model to learn a joint probability distribution of the plurality of contextual N-grams against the plurality of topics.

6. The method of claim 1, wherein preprocessing the content to generate the plurality of contextual N-grams comprises:
    removing stop words to generate tokens for the content;
    for each document in the content, identifying groups of consecutive tokens in the content having sufficiently close word embeddings; and
    aggregating tokens in each group of consecutive tokens in the content into contextual N-grams.

7. The method of claim 1 further comprising training, at least partly, the one or more topic-based deep learning models with the content and the tags.

8. An apparatus comprising:
a processor; and
a computer-readable medium having instructions stored thereon that are executable by the processor to cause the apparatus to,
preprocess content to generate a plurality of contextual N-grams, wherein a contextual N-gram is a group of consecutive tokens in the content aggregated together based, at least in part, on proximity of word embeddings for words in the contextual N-gram;
based on determining that at least one confidence value obtained as output from inputting the plurality of contextual N-grams into one or more topic-based deep learning models is below a threshold confidence value, input the plurality of contextual N-grams into a generative statistical model to generate a plurality of weighted vectors for the plurality of contextual N-grams, wherein each of the plurality of weighted vectors comprises likelihood values that a corresponding one of the plurality of contextual N-grams belongs to each of a plurality of topics;
select tags for the content based on the plurality of weighted vectors, wherein the tags comprise at least a subset of the plurality of contextual N-grams, and wherein the instructions executable by the processor to cause the apparatus to select the tags comprise instructions to, for each topic of the plurality of topics, select one of the plurality of contextual N-grams with a greatest likelihood value of belonging to the topic; and
supplement the one or more topic-based deep learning models with the tags.

9. The apparatus of claim 8, wherein the instructions executable by the processor to cause the apparatus to supplement the one or more topic-based deep learning models comprise instructions to retrain at least a first of the one or more topic-based deep learning models with the content and the tags.

10. The apparatus of claim 8, wherein the instructions executable by the processor to cause the apparatus to supplement the one or more topic-based deep learning models with the tags comprise instructions to communicate to a recommender system the tags, content, and predicted tags from the one or more topic-based deep learning models.

11. The apparatus of claim 8, wherein the generative statistical model is a latent Dirichlet allocation model.

12. The apparatus of claim 8, wherein the instructions executable by the processor to cause the apparatus to input the plurality of contextual N-grams into the generative statistical model to generate the plurality of weighted vectors for each of the plurality of contextual N-grams comprise instructions to train the generative statistical model to learn a joint probability distribution of the plurality of contextual N-grams against the plurality of topics.

13. The apparatus of claim 8, wherein the instructions executable by the processor to cause the apparatus to preprocess the content to generate the plurality of contextual N-grams comprise instructions to:
remove stop words to generate tokens for the content;
for each document in the content, identify groups of consecutive tokens in the content having sufficiently close word embeddings; and
aggregate tokens in each group of consecutive tokens in the content into contextual N-grams.

14. The apparatus of claim 8, further comprising instructions executable by the processor to cause the apparatus to train, at least partly, the one or more topic-based deep learning models with the content and the tags.

15. A non-transitory, machine-readable medium having program code stored thereon, the program code comprising instructions to:
preprocess content to generate a plurality of contextual N-grams, wherein a contextual N-gram is a group of consecutive tokens in the content aggregated together based, at least in part, on proximity of word embeddings for words in the contextual N-gram;
based on determining that at least one confidence value obtained as output from inputting the plurality of contextual N-grams into one or more topic-based deep learning models is below a threshold confidence value, input the plurality of contextual N-grams into a generative statistical model to generate a plurality of weighted vectors for the plurality of contextual N-grams, wherein each of the plurality of weighted vectors comprises likelihood values that a corresponding one of the plurality of contextual N-grams belongs to each of a plurality of topics;
select tags for the content based on the plurality of weighted vectors, wherein the tags comprise at least a subset of the plurality of contextual N-grams, and wherein the instructions to select the tags comprise instructions to, for each topic of the plurality of topics, select one of the plurality of contextual N-grams with a greatest likelihood value of belonging to the topic; and
supplement the one or more topic-based deep learning models with the tags.

16. The non-transitory, machine-readable medium of claim 15, wherein the instructions to supplement the one or more topic-based deep learning models with the tags comprise instructions to retrain at least a first of the one or more topic-based deep learning models with the content and the tags.

17. The non-transitory, machine-readable medium of claim 15, wherein the instructions to supplement the one or more topic-based deep learning models with the tags comprise instructions to communicate to a recommender system the tags, content, and predicted tags from the one or more topic-based deep learning models.

18. The non-transitory, machine-readable medium of claim 15, wherein the generative statistical model is a latent Dirichlet allocation model.

19. The non-transitory, machine-readable medium of claim 15, wherein the instructions to input the plurality of contextual N-grams into the generative statistical model to generate the plurality of weighted vectors for each of the plurality of contextual N-grams comprise instructions to train the generative statistical model to learn a joint probability distribution of the plurality of contextual N-grams against the plurality of topics.

20. The non-transitory, machine-readable medium of claim 15, wherein the instructions to preprocess the content to generate the plurality of contextual N-grams comprise instructions to:
remove stop words to generate tokens for the content;
for each document in the content, identify groups of consecutive tokens in the content having sufficiently close word embeddings; and aggregate tokens in each group of consecutive tokens in the content into contextual N-grams.

\* \* \* \* \*